United States Patent
Gaedt et al.

(10) Patent No.: US 10,618,842 B2
(45) Date of Patent: Apr. 14, 2020

(54) ACCELERATOR COMPOSITION

(71) Applicant: BASF SE, Ludwigshafen am Rhein (DE)

(72) Inventors: Torben Gaedt, Traunstein (DE); Christoph Hesse, Ebersberg (DE)

(73) Assignee: BASF SE, Ludwigshafen am Rhein (DE)

( * ) Notice: Subject to any disclaimer, the term of this patent is extended or adjusted under 35 U.S.C. 154(b) by 138 days.

(21) Appl. No.: 15/753,603

(22) PCT Filed: Aug. 19, 2016

(86) PCT No.: PCT/EP2016/069731
§ 371 (c)(1),
(2) Date: Feb. 20, 2018

(87) PCT Pub. No.: WO2017/032719
PCT Pub. Date: Mar. 2, 2017

(65) Prior Publication Data
US 2019/0263720 A1 Aug. 29, 2019

(30) Foreign Application Priority Data
Aug. 21, 2015 (EP) .................................. 15181990

(51) Int. Cl.
*C04B 7/00* (2006.01)
*C04B 24/26* (2006.01)
(Continued)

(52) U.S. Cl.
CPC .......... *C04B 24/2647* (2013.01); *C04B 28/02* (2013.01); *C04B 40/0039* (2013.01);
(Continued)

(58) Field of Classification Search
None
See application file for complete search history.

(56) References Cited

U.S. PATENT DOCUMENTS 5,549,419 A * 8/1996 Kayahara ................ C04B 28/26
405/263
5,709,743 A 1/1998 Leture et al.
(Continued)

FOREIGN PATENT DOCUMENTS

DE 694 07 418 T2 5/1998
EP 2 842 927 A1 3/2015
(Continued)

OTHER PUBLICATIONS

Search Report dated Feb. 10, 2016 in European Patent Application No. 15181990.1 (with English translation of categories of cited documents) citing references AA-AB and AO-AQ therein, 4 pages.
(Continued)

*Primary Examiner* — Richard A Huhn
(74) *Attorney, Agent, or Firm* — Oblon, McClelland, Maier & Neustadt, L.L.P.

(57) ABSTRACT

The invention relates to a process for producing a composition suitable as accelerator for the curing of cement, by contacting the components aa) at least one component selected from the series of hydraulic binders and/or latent hydraulic binders, and bb) at least one dispersant suitable for the dispersing of inorganic particles in water, and cc) water, the weight ratio of components aa) to cc) being between 1.5:1 and 1:70, wherein the rate ratio of components aa) to bb) is between 20:1 and 1:2. In addition, the use of the composition obtained as hardening acceleration for chemical mixtures in construction is disclosed.

13 Claims, 1 Drawing Sheet

(51) Int. Cl.
*C04B 28/02* (2006.01)
*C04B 40/00* (2006.01)
C04B 103/00 (2006.01)
C04B 103/14 (2006.01)
C04B 103/40 (2006.01)

(52) U.S. Cl.
CPC .. *C04B 2103/0053* (2013.01); *C04B 2103/14* (2013.01); *C04B 2103/408* (2013.01)

(56) References Cited

U.S. PATENT DOCUMENTS

| | | |
|---|---|---|
| 9,676,666 B2 | 6/2017 | Hesse et al. |
| 2007/0181041 A1 | 8/2007 | Kanazawa et al. |
| 2011/0269875 A1 | 11/2011 | Nicoleau et al. |
| 2012/0220696 A1* | 8/2012 | Nicoleau ............ C04B 40/0039 524/3 |
| 2014/0199488 A1 | 7/2014 | Alfonso et al. |
| 2016/0318802 A1* | 11/2016 | Ferrari ................. C04B 28/04 |

FOREIGN PATENT DOCUMENTS

| | | | | |
|---|---|---|---|---|
| EP | 2842927 A1 | * | 3/2015 | ............ C04B 28/02 |
| GB | 2 283 260 A | | 5/1995 | |
| WO | WO 2006/042709 A1 | | 4/2006 | |
| WO | WO 2010/026155 A1 | | 3/2010 | |
| WO | WO-2010026155 A1 | * | 3/2010 | ............ C04B 28/02 |
| WO | WO 2010/040612 A1 | | 4/2010 | |
| WO | WO 2012/072450 A2 | | 6/2012 | |
| WO | WO 2014/026938 A1 | | 2/2014 | |
| WO | WO 2015/086453 A1 | | 6/2015 | |
| WO | WO 2015/091461 A1 | | 6/2015 | |

OTHER PUBLICATIONS

Nicoleau, L. "The acceleration of cement hydration by seeding: influence of the cement mineralogy", Ibausil 18$^{th}$ International Construction Material Conference at Weimar, Sep. 2012, pp. 1-13 (with cover page).
International Search Report dated Nov. 11, 2016, in PCT/EP2016/069731, filed Aug. 19, 2016.
U.S. Appl. No. 15/113,589, filed Jul. 22, 2016, Max Siebert et al.

* cited by examiner

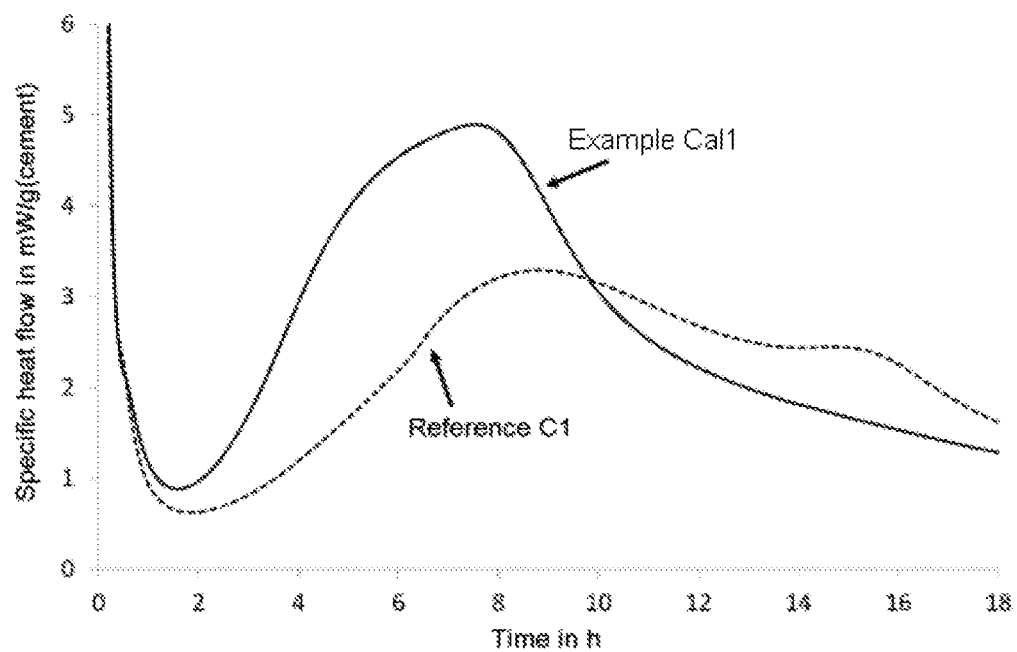

ACCELERATOR COMPOSITION

The present invention relates to a process for producing a composition suitable as an accelerator for the curing of cement.

In cement hydration, the various cement clinker phases react with water substantially to form the hardened cement phases calcium silicate hydrate, ettringite, calcium aluminate ferrite phases, monosulfate, and portlandite.

WO 2010026155 discloses accelerating the hydration cement by addition of calcium silicate hydrates seeds to cement or in concrete. The development of strength by a cement can be accelerated by the addition of such calcium silicate hydrate seeds. In that case the calcium silicate hydrate seeds are produced by reaction of a water-soluble calcium component with a water-soluble silicon component in aqueous solution in the presence of a water-soluble comb polymer suitable as a plasticizer for hydraulic binders.

DE 694 07 418 discloses a solidification and hardening accelerator for silicatic, hydraulic binders which originates in particular from the hydration of artificial Portland cements, comminuted Portland clinkers or composite Portland cements, or mixtures of the aforesaid starting materials. For many applications, however, the acceleration effect is insufficient, and fairly large quantities of this accelerator must be used, meaning that there are also limits on the economically rational possibilities for use.

The problem addressed by the present invention is that of providing a process for producing a composition that is suitable as a hardening accelerator for hydraulically setting binders and that improves the development of early strength by the hydraulically setting binders, more particularly by cement. Development of early strength refers in particular to the compressive strength 6 hours after the hydraulically setting binder, or a hydraulically setting binder mixture, has been prepared by mixing with water. Furthermore, the composition ought to be able to be produced economically advantageously with favorable and readily available raw materials.

The solution to this problem is a process for producing a composition suitable as accelerator for the curing of cement, by contacting the components aa) at least one component selected from the series of hydraulic binders and/or latent hydraulic binders, and bb) at least one dispersant suitable for the dispersing of inorganic particles in water, and cc) water, the weight ratio of components aa) to cc) being between 1.5:1 and 1:70 and wherein the weight ratio of components aa) to bb) is between 20:1 and 1:2.

Surprisingly it has emerged in this context that not only has it been possible to solve the stated problem to its full extent but also the composition produced in accordance with the invention receives no unwanted salts from the production operation.

With further preference, bb), the at least one dispersant, comprises a water-soluble polymer preferably comprising at least two monomer units. It may also, however, be advantageous to use copolymers having three or more monomer units.

"Water-soluble polymers" in the sense of the present specification are polymers which in water at 20° C. under atmospheric pressure have a solubility of at least 1 gram per liter, more particularly at least 10 grams per liter, and very preferably of at least 100 grams per liter.

In one preferred embodiment, said at least one dispersant comprises polyether groups of the structural unit (I)

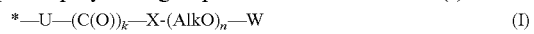

where

* indicates the site of bonding to the polymer,

U is a chemical bond or an alkylene group having 1 to 8 carbons,

X is oxygen, sulfur or a group $NR^1$, k is 0 or 1, n is an integer whose average value, based on the polymer, is in the range from 3 to 300, Alk is $C_2$-$C_4$ alkylene, and within the group $(Alk-O)_n$ Alk may be identical or different, W is a hydrogen, a $C_1$-$C_6$ alkyl or an aryl radical or is the group Y—F, where Y is a linear or branched alkylene group having 2 to 8 carbons and may carry a phenyl ring, F is a 5- to 10-membered nitrogen heterocycle which is bonded via nitrogen and which as ring members, besides the nitrogen atom and besides carbon atoms, may have 1, 2 or 3 additional heteroatoms selected from oxygen, nitrogen, and sulfur, it being possible for the nitrogen ring members to have a group $R^2$, and for 1 or 2 carbon ring members to be present in the form of a carbonyl group, $R^1$ is hydrogen, $C_1$-$C_4$ alkyl or benzyl, and $R^2$ is hydrogen, $C_1$-$C_4$ alkyl or benzyl With particular preference, the dispersant of the invention comprises at least one group from the series of carboxyester, carboxyl, phosphono, sulfino, sulfo, sulfamido, sulfoxy, sulfoalkyloxy, sulfinoalkyloxy, and phosphonooxy group.

With more particular preference, the polymer of the invention comprises an acid group. The term "acid group" is understood in the present specification to refer both to the free acid and to the salts thereof. The acid may preferably be at least one from the series of carboxyl, phosphono, sulfino, sulfo, sulfamido, sulfoxy, sulfoalkyloxy, sulfinoalkyloxy, and phosphonooxy group. Particularly preferred are carboxyl and phosphonooxy groups.

In one particularly preferred embodiment, the dispersant comprises a polycondensation product comprising (II) a structural unit containing an aromatic or heteroaromatic and the polyether group, and also (III) a phosphated structural unit containing an aromatic or heteroaromatic.

The structural units (II) and (III) are preferably represented by the following general formulae

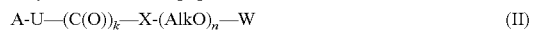

where

A is identical or different and is represented by a substituted or unsubstituted, aromatic or heteroaromatic compound having 5 to 10 carbons in the aromatic system, the other radicals possessing the definition stated for structural unit (I);

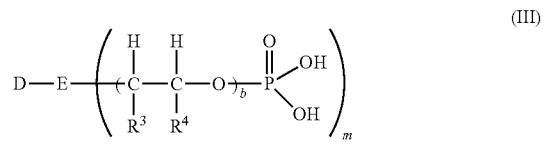

where

D is identical or different and is represented by a substituted or unsubstituted, aromatic or heteroaromatic compound having 5 to 10 carbons in the aromatic system.

Furthermore, E is identical or different and is represented by N, NH or O, m=2 if E=N and m=1 if E=NH or O.

$R^3$ and $R^4$ independently of one another are identical or different and are represented by a branched or unbranched $C_1$ to $C_{10}$ alkyl radical, $C_5$ to $C_8$ cycloalkyl radical, aryl radical, heteroaryl radical or H, preferably by H, methyl, ethyl or phenyl, more preferably by H or methyl, and especially preferably by H. Furthermore, b is identical or different and is represented by an integer from 0 to 300. If b=0, E=O. More preferably D=phenyl, E=O, $R^3$ and $R^4$=H, and b=1.

The polycondensation product preferably comprises a further structural unit (IV) which is represented by the following formula

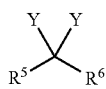
(IV)

where

Y independently at each occurrence is identical or different and is represented by (II), (III) or further constituents of the polycondensation product.

$R^5$ and $R^6$ are preferably identical or different and represented by H, $CH_3$, COOH or a substituted or unsubstituted, aromatic or heteroaromatic compound having 5 to 10 carbons. $R^5$ and $R^6$ here in structural unit (IV) are independently of one another preferably represented by H, COOH and/or methyl.

In one particular preferred embodiment, $R^5$ and $R^6$ are represented by H.

The molar ratio of the structural units (II), (III), and (IV) in the phosphated polycondensation product of the invention may be varied within wide ranges. It has proven useful for the molar ratio of the structural units [(II)+(III)]:(IV) to be 1:0.8 to 3, preferably 1:0.9 to 2, and more preferably 1:0.95 to 1.2.

The molar ratio of the structural units (II):(III) is normally 1:10 to 10:1, preferably 1:7 to 5:1, and more preferably 1:5 to 3:1.

The groups A and D in the structural units (II) and (III) in the polycondensation product are usually represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, preferably phenyl, and A and D may be selected independently of one another and may also each consist of a mixture of the stated compounds. The groups X and E are represented independently of one another preferably by O.

Preferably, n in structural unit (I) is represented by an integer from 5 to 280, more particularly 10 to 160, and very preferably 12 to 120, and b in structural unit (III) is represented by an integer from 0 to 10, preferably 1 to 7, and more preferably 1 to 5. The representative radicals whose length is defined by n and b may consist here of uniform structural groups, though it may also be useful for them to comprise a mixture of different structural groups. Furthermore, the radicals of the structural units (II) and (III) may independently of one another each have the same chain length, with n and b in each case being represented by one number. In general, however, it will be useful for these each to be mixtures having different chain lengths, and so the radicals of the structural units in the polycondensation product have different numerical values for n and, independently for b.

In one particular embodiment, the present invention further envisages a sodium, potassium, ammonium and/or calcium salt, and preferably a sodium and/or potassium salt, of the phosphated polycondensation product.

The phosphated polycondensation product of the invention frequently has a weight-average molecular weight of 5000 g/mol to 150 000 g/mol, preferably 10 000 to 100 000 g/mol, and more preferably 20 000 to 75 000 g/mol.

With regard to the phosphated polycondensation products for preferred use in accordance with the present invention, and to their preparation, reference is additionally made to patent applications WO 2006/042709 and WO 2010/040612, the content of which is hereby incorporated into the specification.

In a further preferred embodiment, the dispersant comprises at least one copolymer which is obtainable by polymerization of a mixture of monomers comprising (V) at least one ethylenically unsaturated monomer which comprises at least one radical from the series of carboxylic acid, carboxylic salt, carboxylic ester, carboxylic amide, carboxylic anhydride, and carboxylic imide and (VI) at least one ethylenically unsaturated monomer comprising a polyether group, the polyether group being represented preferably by the structural unit (I).

The copolymers in accordance with the present invention contain at least two monomer units. It may, however, also be advantageous to use copolymers having three or more monomer units.

In one preferred embodiment, the ethylenically unsaturated monomer (V) is represented by at least one of the following general formulae from the group of (Va), (Vb), and (Vc):

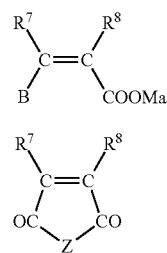

In the monocarboxylic or dicarboxylic acid derivative (Va) and in the monomer (Vb) present in cyclic form, where Z=O (acid anhydride) or $NR^{16}$ (acid imide), $R^7$ and $R^8$ independently of one another are hydrogen or an aliphatic hydrocarbon radical having 1 to 20 carbons, preferably a methyl group. B is H, $-COOM_a$, $-CO-O(C_qH_{2q}O)_r-R^9$, $-CO-NH-(C_qH_{2q}O)_r-R^9$.

M is hydrogen, a mono- or di- or trivalent metal cation, preferably sodium, potassium, calcium or magnesium ion, or else ammonium or an organic amine radical, and a=⅓, ½ or 1, according to whether M is a mono-, di- or trivalent cation. Organic amine radicals used are preferably substituted ammonium groups which derive from primary, secondary or tertiary $C_{1-20}$ alkylamines, $C_{1-20}$ alkanolamines, cycloalkylamines, and $C_{6-14}$ arylamines. Examples of the corresponding amines are methylamine, dimethylamine, trimethylamine, ethanolamine, diethanolamine, triethanolamine, methyldiethanolamine, cyclohexylamine, dicyclohexylamine, phenylamine, diphenylamine in the protonated (ammonium) form.

$R^9$ is hydrogen, an aliphatic hydrocarbon radical having 1 to 20 carbons, a cycloaliphatic hydrocarbon radical having 5 to 8 carbons, an aryl radical having 6 to 14 carbons, this radical optionally being substituted as well, q=2, 3 or 4 and r=0 to 200, preferably 1 to 150. The aliphatic hydrocarbons here may be linear or branched and also saturated or unsaturated. Preferred cycloalkyl radicals are cyclopentyl or cyclohexyl radicals, and preferred aryl radicals are phenyl or naphthyl radicals, which in particular may also be substituted by hydroxyl, carboxyl or sulfonic acid groups. Furthermore, Z is O or $NR^{16}$, where $R^{16}$ independently of each occurrence is identical or different and is represented by a branched or unbranched $C_1$ to $C_{10}$ alkyl radical, $C_5$ to $C_8$ cycloalkyl radical, aryl radical, heteroaryl radical or H.

The following formula represents the monomer (Vc):

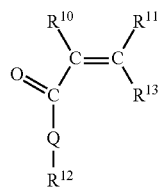

(Vc)

In this formula, $R^{10}$ and $R^{11}$ independently of one another are hydrogen or aliphatic hydrocarbon radical having 1 to 20 carbons, a cycloaliphatic hydrocarbon radical having 5 to 8 carbons, an optionally substituted aryl radical having 6 to 14 carbons.

Furthermore, $R^{12}$ is identical or different and is represented by $(C_n-H_{2n})-SO_3H$ with n=0, 1, 2, 3 or 4, $(C_nH_{2n})-OH$ with n=0, 1, 2, 3 or 4; $(C_nH_{2n})-PO_3H_2$ with n=0, 1, 2, 3 or 4, $(C_nH_{2n})-OPO_3H_2$ with n=0, 1, 2, 3 or 4, $(C_5H_4)-SO_3H$, $(C_6H_4)-PO_3H_2$, $(C_6H_4)-OPO_3H_2$ and $(C_nH_{2n})-NR^{14}{}_b$ with n=0, 1, 2, 3 or 4 and b by 2 or 3.
$R^{13}$ is H, $-COOM_a$, $-CO-O(C_qH_{2q}O)_r-R^9$, $-CO-NH-(C_qH_{2q}O)_r-R^9$, where $M_a$, $R^9$, q and r possess the definitions stated above.

$R^{14}$ is hydrogen, an aliphatic hydrocarbon radical having 1 to 10 carbons, a cycloaliphatic hydrocarbon radical having 5 to 8 carbons, an optionally substituted aryl radical having 6 to 14 carbons.

Furthermore, Q is identical or different and is represented by NH, $NR^{15}$ or O, where $R^{15}$ is an aliphatic hydrocarbon radical having 1 to 10 carbons, a cycloaliphatic hydrocarbon radical having 5 to 8 carbons or an optionally substituted aryl radical having 6 to 14 carbons.

In one particularly preferred embodiment, the ethylenically unsaturated monomer (VI) is represented by the following general formulae (VIa)

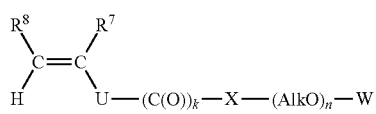

(VIa)

in which all the radicals having the definitions above.

In a further-preferred embodiment, the ethylenically unsaturated monomer (VI) is represented by the following general formulae (VIb)

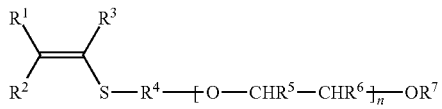

(VIb)

where
$R^1$, $R^2$, $R^3$ independently of one another, identically or differently, are H, $CH_3$,
$R^4$ is linear or branched $C_1-C_{30}$ alkylene,
$R^5$, $R^6$ independently of one another, identically or differently, are H, $C_1-C_{20}$ alkyl, $C_3-C_{15}$ cycloalkyl, aryl, $-CH_2-O-C_1-C_{20}$ alkyl, $CH_2-O-C_2-C_{20}$ alkenyl, and $R^5$ and $R^6$ may also together form a $C_3-C_6$ alkylene,
$R^7$ independently at each occurrence, identically or differently, is H, $C_1-C_4$ alkyl,

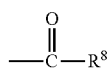

$R^8$ is $C_1-C_{22}$ alkyl, $C_2-C_{22}$ alkenyl, and
n independently at each occurrence, is identical or different and is an integer from 2 to 200.

In particular, the copolymer has an average molar weight (Mw) of between 5000 and 150 000 g/mol, more preferably 10 000 to 80 000 g/mol, and very preferably 15 000 to 60 000 g/mol, as determined by gel permeation chromatography.

The polymers are analyzed for average molar mass and conversion by means of size exclusion chromatography (column combinations: Shodex OH-Pak SB 804 HQ and OH-Pak SB 802.5 HQ from Showa Denko, Japan; eluent: 80 vol % aqueous solution of $HCO_2NH_4$ (0.05 mol/l) and 20 vol % MeOH; injection volume 100 μl; flow rate 0.5 ml/min)).

The copolymer of the invention preferably fulfills the requirements of the industry standard EN 934-2 (February 2002).

A further-preferred embodiment of the present specification is a process of the invention wherein the components
aa) at least one component selected from the series of hydraulic binders and/or latent hydraulic binders, and
bb) at least one dispersant suitable for the dispersing of inorganic particles in water, and
cc) water,
are contacted with one another until
the suspended matter fraction M is greater than 25 wt %, M being determined by the following method:
a) preparing a suspension by making up 2 grams of the composition, based on the solids fraction, to a volume of 100 ml with distilled water
b) transferring the suspension to a measuring cylinder to reach a height of 20 cm in the cylinder
c) leaving the cylinder to stand at 20° C. for 24 hours
d) fully decanting the supernatant into a beaker
e) carrying out quantitative determination of the mass m and the solids content SC for
i) the sediment in the measuring cylinder ($m_{sediment}$ and $SC_{sediment}$) and
ii) the supernatant ($m_{supernatant}$ and $SC_{supernatant}$), the suspended matter fraction M being calculated as follows:
$M = SC_{supernatant} \cdot m_{supernatant} / (SC_{sediment} \cdot m_{sediment} \cdot SC_{supernatant} \cdot m_{supernatant}) \cdot 100\%$.

In one particularly preferred embodiment, the suspended matter fraction M of the composition is greater than 35 wt %, more particularly greater than 40 wt %, 45 wt %, 50 wt %, 60 wt %, 65 wt %, 70 wt %, 75 wt %, and more preferably greater than 80 wt %.

Said contacting of the components takes place in particular with mixing. Suitable for this purpose are virtually all forms of equipment known to the skilled person. Mixing in the context of this invention means commingling or homogenizing that intensifies the contact between the components to be mixed and is therefore intended to allow uniform and/or rapid formation of the desired product. The mixing may generate a very largely homogeneous mixture and/or initiate or accelerate a chemical reaction.

Examples of methods which bring about mixing are stirring, shaking, the nozzle injection of gases or liquids, and irradiation with ultrasound. Suitable processes and apparatus which bring about mixing are known to the skilled person. Suitable mixing apparatuses are, for example, stirred tanks, dynamic and static mixers, single-shaft stirring mechanisms, examples being stirring mechanisms that have scraper devices, especially those as paste stirrers, multishaft stirrers, especially PDSM mixers, solid mixers, and also mixing/kneading reactors. Advantageous in this context for the reaction rate and product quality are processes which introduce a high shearing energy. With more particular preference, therefore, the process of the invention is carried out at least temporarily using an apparatus from the series of toothed colloid mill, bead mill, ball mill, ultrasound devices, rotor-stator (e.g. IKA Ultra-Turrax), and dissolver disk.

In one preferred embodiment, said contacting takes place with introduction of shearing energy, with more than 100 kWh, more particularly more than 500 kWh, preferably more than 1000 kWh, more particularly 200 to 10 000 kWh, especially preferably 300 to 3000 kWh of shearing energy being introduced per metric ton of composition.

The stated shearing energy pertains to the power taken up by the apparatus used during the grinding of one metric ton of the composition.

The introduction of shearing energy may be carried out in particular in a stirred ball mill. The stirred ball mill comprises a grinding chamber containing grinding media, and a stator and a rotor which are disposed in the grinding chamber. With further preference the stirred ball mill comprises a grinding-stop inlet aperture and a grinding-stop outlet aperture for feeding grinding stock into and out of the grinding chamber, respectively, and also a grinding media removal device, which is disposed upstream of the outlet opening in the grinding chamber and which serves to remove grinding media carried in the grinding stock from the grinding stock before the latter is fed out of the grinding compartment through the outlet opening.

In order to boost the mechanical grinding power introduced into the grinding stock in the grinding chamber, the rotor and/or the stator preferably carry pins which project into the grinding compartment. In operation, therefore, a contribution to the grinding power is provided first of all, directly, by impacts between the grinding stock and the pins. On the other hand, a further contribution to the grinding power is made indirectly, by impacts between the pins and the grinding media carried in the grinding stock, and by the impacts that then take place in turn between the grinding stock and the grinding media. Lastly, further contributions to comminuting the suspended grinding-stock particles are also made by expansion forces and shearing forces which act on the grinding stock.

In a further-preferred embodiment, the weight ratio of components aa) to bb) is between 10:1 and 1:2, more particularly between 5:1 and 1:1.5, especially preferably between 3:1 and 1:1. With wide preference, the weight ratio of components aa) to cc) may be between 1:1 and 1:10.

Said contacting of the components essential to the invention may also take place, advantageously, with a temporal offset. In that case it is preferred first to contact components aa) and cc) and only then to add component bb). By this means it is possible to reduce the amount of dispersant used for the same activity of the resulting product. In particular, component bb) may be added between 5 and 60 minutes, more particularly between 15 and 45 minutes, and very preferably between 20 and 40 minutes after the contacting of components aa) and cc).

In a further preferred embodiment, a portion of component bb) is added during the mixing of components aa) and cc), and the remainder of component bb) is added between 0.01 $t_M$ and 1.00 $t_M$, more particularly between 0.25 $t_M$ and 1.00 $t_M$, and very preferably between 0.5 $t_M$ and 1.00 $t_M$ after the contacting of components aa) and cc). Here, $t_M$ is the total mixing time in the process for producing the composition.

Component aa) is understood to comprise hydraulic binders, especially cement based on Portland cement (EN 197), cement with special properties (DIN 1164), white cement, calcium aluminate cement or high-alumina cement (EN 14647), calcium sulfoaluminate cement, and specialty cements.

For the purposes of the specification, latent hydraulic binders are, in particular, pozzolan, volcanic slag, volcanic tuff, flyash, blast furnace slag, microsilica, kaolin, metakaolin, activated clay, trass, pozzolana, kieselguhr, and also diatomaceous earth in conjunction with an alkaline activator, especially preferably waterglass.

With particular preference, component aa) is a hydraulic binder, more particularly Portland cement, preferably white cement.

In one preferred embodiment, the components contacted with one another in the process of the invention consist to an extent of at least 50 wt %, preferably at least 70 wt %, more particularly at least 80 wt %, very preferably at least 90 wt %, of components aa), bb) and cc). More particularly, the components contacted with one another in the process of the invention may consist of components aa), bb), and cc).

In one preferred embodiment a further component dd) is used in the form of an $SiO_2$ source, such as colloidal $SiO_2$, finely divided silica (e.g., Aerosil, Sipernat), microsilica or flyash, in the process of the invention. Suitable in that case in particular are amounts between 1 and 20 wt %, more particularly 5 to 15 wt %, based on all the components used.

Furthermore, a calcium sulfate source may be used as further component ee). Suitable in that case in particular are amounts between 1 and 10 wt %, more particularly 2 to 8 wt %, based on all the components used.

Furthermore, a component ff) may be used in the process of the invention that comprises calcium silicate hydrate in finely divided form. Particularly suitable for example are the compositions described in WO 2010026155 on pages 37 to 42. Especially suitable in that case are amounts between 1 and 15 wt %, more particularly 2 to 10 wt %, based on all the components used.

The process of the invention may be carried out at room temperature under atmospheric pressure. In order to accelerate the reaction, however, it is also possible to select higher temperatures and optionally to operate under increased pressure. The process may advantageously be carried out at temperatures between 50° C. and 250° C. In that case it is possible to employ a pressure of up to 40 bar.

The invention also relates to the use of the compositions of the invention for accelerating hardening of chemical mixtures in construction, comprising cement, slag, preferably granulated blast furnace slag, flyash, finely ground silica, metakaolin, natural pozzolans, calcined oil shale, calcium sulfoaluminate cements and/or calcium aluminate cements, preferably in chemical mixtures in construction which comprise predominantly cement as hydraulic binder.

The amount of the compositions of the invention added is preferably from 0.01 wt % to 15 wt %, more preferably 0.1 wt % to 6 wt %, very preferably 0.1 wt % to 5 wt % of the solids of the compositions, based on the inorganic binders—cement, slag, preferably granulated blast furnace slag, flyash, finely ground silica, metakaolin, natural pozzolans, calcium oil shale, calcium sulfoaluminate cements and/or calcium aluminate cements. The amount of the compositions of the invention added is preferably from 0.01 wt % to 15 wt %, more preferably 0.1 wt % to 8 wt %, very preferably 0.5 wt % to 5 wt % of the solids of the compositions, based on cement.

The cement is preferably selected from Portland cement, high-alumina cement, calcium sulfoaluminate cement, or mixtures of the stated cement types. Especially preferred is cement of the Portland cement type.

EXAMPLES

Determination of Suspended Matter Fraction M

The suspended matter fraction M describes the tendency of the particulate suspension to undergo sedimentation, and is obtained from the ratio of the solids in the supernatant after a certain time to the solids in the suspension as a whole. To determine the suspended matter fraction M, the following steps are carried out:

a) Determination of the empty weight $m_0$ of a 100 ml measuring cylinder
b) Preparation of a suspension by placing 2 grams of the inventive composition, based on the solids fraction, into the cylinder, making up the cylinder to a volume of 100 ml with distilled water, and homogenizing the suspension by shaking. The aim of the dilution step is to reduce the particle-particle interactions during sedimentation in the field of gravity, and so allowing the sedimentation process to proceed in accordance with Stokes' law. The height of the suspension in the measuring cylinder here reaches 20 cm.
c) The suspension is left to stand at 20° C. for 24 hours. During this time the cylinder is covered in order to minimize evaporation of water.
d) After 24 hours, the supernatant is separated from the settled sediment by decanting. This is done by transferring the supernatant into a beaker provided, whose empty weight $m_{0(supernatant)}$ has been determined beforehand. It is very important here to avoid remixing of the settled sediment with the supernatant. Mixing of the sediment with supernatant would falsify the determination of the suspended matter fraction M.
e) The mass of sediment $m_{sediment}$ is determined after decanted by weighing of the cylinder, including sediment, and subtraction of the empty weight $m_0$ of the cylinder.
f) The mass of the supernatant $m_{supernatant}$ determined after decanting by weighing of the beaker including the supernatant and subtraction of the empty weight of the beaker $m_{0(supernatant)}$.
g) Sediment and supernatant are homogenized again
h) A sample is taken from each of the sediment and the supernatant, and the solids content of each such sample is determined by drying to constant weight at 105° C. This is preferably done using a drying balance with infrared heating.

The solids content may alternatively also be determined by storage of the sample in a drying cabinet at 105° C. for 6 hours. The drying then gives, accordingly, the solids contents for the supernatant $SC_{supernatant}$ and for the sediment $SC_{sediment}$.

i) Lastly, from the values determined, the suspended matter fraction M is calculated as follows:

$$M = SC_{supernatant} \cdot m_{supernatant} / (SC_{sediment} \cdot m_{sediment} \cdot SC_{supernatant} \cdot m_{supernatant}) \cdot 100\%.$$

The higher the suspended matter fraction M, the fewer the particles which have undergone sedimentation after 24 hours. Accordingly, a suspended matter fraction M of 100% indicates that the inventive suspension exhibits no sedimentation at all.

Calorimetry

To estimate the acceleration performance of the samples, measurements were carried out by isothermal heat flow calorimetry on the TAMAir instrument from TA Instruments.

Polymers 1 and 2:

General protocol for the preparation of polymers 1 and 2:

A 1-liter four-neck flask with thermometer, reflux condenser and a connection for two feeds is charged with 875 g of 40% strength aqueous polyethylene glycol hydroxybutyl monovinyl ether and NaOH (20%). The details of the molar masses of the respective polyethylene glycol hydroxybutyl monovinyl ethers can be found in table B. Thereafter the solution is cooled to 20° C. Acrylic acid (99%) is now slowly added to the solution of polyethylene glycol hydroxybutyl monovinyl ether in the reservoir flask. The pH here falls to around 4-5. Next, 0.5 g of iron(II) sulfate heptahydrate and also 5 g of Rongalite and mercaptoethanol are added. After brief incorporation by stirring, the metered addition takes place of a further 3 g of 50% of hydrogen peroxide. The temperature here rises from 20° C. to about 30° C. up to 65° C. The solution is subsequently stirred for 10 minutes before being neutralized with aqueous sodium hydroxide solution (20%). The result is a clear aqueous polymer solution with a slight yellow coloration and a variable solids content. All variable quantities for the chemicals used in preparing the polycarboxylate ethers polymer 1 and polymer 2 (NaOH, mercaptoethanol and acrylic acid), and the molar masses of the respective polyethylene glycol hydroxybutyl monovinyl ether can be found in tables A and B below.

TABLE A details of the preparation of polymers 1 and 2

| | NaOH (20%) [g] | Mercaptoethanol [g] | Acrylic acid (99%) [g] |
|---|---|---|---|
| Polymer 1 | 40 | 6.0 | 122.8 |
| Polymer 2 | 20 | 2.7 | 84.9 |

Table B affords an overview of the structural parameters of the polycarboxylate ethers used as spraying assistants.

TABLE B overview of the structural parameters of the PCEs

| Additive (PCE) | A | B | C | Solids content (wt %) |
|---|---|---|---|---|
| Polymer 1 | 1/900 | 28 537 | 5800 | 33.2 |
| Polymer 2 | 1/372 | 23 239 | 3000 | 35.1 |

A: Charge density (number of moles of carboxylate and/or carboxyl groups/total molar mass of the PCE) (mol/(g/mol))
B: Weight-average molecular weight $M_w$ (g/mol)
C: Molar mass of polyethylene glycol hydroxybutyl monovinyl ether used (g/mol)

Polymer 3:
Polymer 3 is a condensate composed of the units phenol PEG5000, phenoxyethanol phosphate and formaldehyde. The molecular weight $M_w$ is 25 730 g/mol. The polymer was prepared in accordance with polymer 7 from WO2015/091461 (tables 1 and 2). The solids content is 33.7 wt %.

Polymer 4:
Polymer 4 is a comb polymer polymerized from a hydroxyethyl methacrylate phosphoric ester and an ester of methacrylic acid and methylpolyethylene glycol with a molecular weight of 5000 g/mol. The synthesis was carried out in accordance with the preparation of P1 from WO2014/026938. The molecular weight $M_w$ is 36 600 g/mol. The solids content of the polymer solution is 28.8 wt %.

BNS:
BNS is a commercially available dispersant based on naphthalenesulfonate. The product Flube CA 40 from Giovanni Bozetto S.p.A. was used. The solids content is 42 wt %.

Blank
50 g of Milke CEM I 52.5 R were mixed with 40 g of water and homogenized with an IKA paddle stirrer at 750 rpm for 90 seconds. 3 g of this homogeneous cement paste were passed on for isothermal heat flow calorimetry.

Example 1 (Inventive)

50 g of Aalborg White Cement CEM I 52.5 R were weighed out into a 2-liter plastic (PE) bottle. Then 40 g of a polycarboxylate ether (dispersant; brand name: Melflux 6681 F) were weighed out into the plastic bottle. Added to this mixture were 900 g of mains water. The bottle was closed with a plastic cap and shaken vigorously by hand until no sediment of still-dry cement was left. Then a magnetic stirring rod was added and the mixture was stirred at 23° C. and 250 revolutions per minute for 2 months. This produces a suspension having a solids content of 10.1 wt %. The solids content is determined by drying the sample at 105° C. to constant mass.
Suspended matter fraction M: 80.1%

Example 2 (Comparative Example)

50 g of Aalborg White Cement CEM I 52.5 R were weighed out into a 2-liter plastic (PE) bottle. Added to the cement were 900 g of mains water. The bottle was closed with a plastic cap and shaken vigorously by hand until no sediment of still-dry cement was left. Then a magnetic stirring rod was added and the mixture was stirred at 23° C. and 250 revolutions per minute for 2 months. In this case a white particulate suspension formed which without being stirred undergoes virtually complete sedimentation within an extremely short time.

This produces a suspension having a solids content of 6.1 wt %. The solids content is determined by drying the sample at 105° C. to constant mass.
Suspended matter fraction M: 29.2%

Comparative Example C1

100 g of Milke CEM I 52.5 R were mixed with 40 g of water and homogenized for 90 seconds with an IKA paddle stirrer at 500 rpm. 3 g of this homogeneous cement paste was supplied for isothermal heat flow calorimetry.

Comparative Example C2

100 g of Milke CEM I 52.5 R were mixed with 12.5 g of the sample from example 2 and 28.26 g of water. The water/cement ratio is therefore 0.4. 3 g of the homogeneous cement paste containing the sample from example 2 were subsequently supplied for isothermal heat flow calorimetry.

Inventive Example

Cal1 (Calorimetry)
100 g of Milke CEM I 52.5 R were mixed with 12.5 g of the sample from example 1 and 28.76 g of water. The water/cement ratio is therefore 0.4. 3 g of the homogeneous cement paste containing the sample from example 1 were subsequently supplied for isothermal heat flow calorimetry.

TABLE 1 summarizes the results:

| Experiment | Acceleration factor according to L. Nicoleau (2012) | Cumulative heat of hydration after 6 h in joules/gram (cement) |
|---|---|---|
| C1 | 1.00 | 23.3 |
| C2 | 1.05 | 26.4 |
| Cal1 | 1.75 | 47.3 |

For comparison of the samples, the maximum slopes in the heat flow between 2 and 8 hours were each ascertained and were placed in relation to the slope of comparative measurement C1. The relative slope was determined in accordance with the publication by L. Nicoleau (2012) (L. Nicoleau: The acceleration of cement hydration by seeding: Influence of the cement mineralogy. Ibausil 18$^{th}$ International Construction Material Conference at Weimar (2012), Conference volume pages 1-0330-1-0337). The heat of hydration here correlates with the development of the early strength of a cement-containing building material mixture (paper by C. Hesse (2014): Small particles with large effect—New pathways of acceleration. 6$^{th}$ Heidelberg Cement Construction Chemistry days at Munster, Apr. 3/4, 2014, Münster).

FIG. 1 shows the heat flow in mW/gram of cement over time for experiments C1 and Cal1.

General Example 3: Grinding in a Shaker 1000 g of $ZrO_2$ grinding beads with a diameter of 0.8-1 mm were weighed out into a 0.5 liter Duran glass bottle. The bottle was tared and, for examples 3.1 to 3.11, 20 g of Aalborg White Cement CEM I 52.5 R were added. For examples 3.12 to 3.14, 20 g of a 1:1 (w/w) mixture of Aalborg White CEM I 52.5 R and Salzgitter slag sand were added. In accordance with table 2, a solution of polymers 1, 2, 3, 4 or BNS was added, to give a specific ratio of cement to polymer. The polymer metering here refers to the solids content of polymer in the polymer solution. Subsequently, the mass balance to 200 g was made with up with deionized water. The bottle was closed with a plastic cap. Batches of 4 bottles were fastened in a shaker (SK 300 from Fast & Fluid Management) and shaken for a defined time (cf. table 2). The resulting suspension was poured off into a sieve and the grinding beads were washed with 50 ml of water to remove adhering suspension. The solids content of the suspension was determined by drying the sample at 130° C. to constant weight.

TABLE 2 shaker grinding

| Example | Polymer | Cement*/Polymer ratio [w/w] | Shaken for [min] | A | B | C |
| --- | --- | --- | --- | --- | --- | --- |
| Blank | — | — | — | 0 | 21.3 | 0.44 |
| 3.1 | — | 0 | 120 | 0 | 55.1 | 0.53 |
| 3.2 | — | 0 | 240 | 0 | 61.0 | 0.65 |
| 3.3 | 1 | 4 | 120 | 93 | 77.3 | 1.24 |
| 3.4 | 1 | 4 | 240 | 93 | 83.7 | 1.15 |
| 3.5 | BNS | 100 | 120 | 0 | 56.5 | 0.58 |
| 3.6 | 1 | 100 | 120 | 0 | 52.8 | 0.59 |
| 3.7 | 1 | 20 | 120 | 73 | 61.7 | 0.80 |
| 3.8 | 1 | 10 | 120 | 91 | 68.6 | 0.97 |
| 3.9 | 2 | 4 | 120 | 62 | 71.0 | 1.26 |
| 3.10 | 3 | 4 | 120 | 96 | 89.3 | 1.22 |
| 3.11 | 4 | 4 | 120 | 64 | 84.4 | 1.14 |
| 3.12 | — | 0 | 120 | 0 | 56.3 | 0.66 |
| 3.13 | 1 | 20 | 120 | 43 | 61.8 | 0.77 |
| 3.14 | 1 | 4 | 120 | 94 | 72.0 | 0.97 |

A: Suspended matter fraction M in [%]
B: Cumulative heat of hydration after 6 h in [joules/gram (cement)]
C: Acceleration factor according to L. Nicoleau (2012) [d(HF)/dt]
Cement*: Cement refers to Aalborg White Cement CEM I 52.5 R or to the 1:1 (w/w) mixture of Aalborg White CEM I 52.5 R and slag sand Examples 3.1 and 3.5 are comparative examples corresponding to DE69407418. Since DE69407418 did not disclose a specific dispersant or any amount for use, the dispersant used in example 3.5 was the standard dispersant BNS in a typically employed amount.

For examples 3.1, 3.3 and 3.5, the sedimentation factor was determined as instructed in DE69407418: a) the suspension obtained in the examples were transferred to a sedimentation cylinder, so that 10 g are contained, based on the solids content of the suspension. b) Then the suspension volume was made up to 100 ml with deionized water, taking account of the water obtained in the suspension. c) The suspension was homogenized by shaking and left to stand at 20° C. for 48 h. The height of the sedimentation residue was read off on the cylinder.
Example 3.1: 100%
Example 3.3: 28%
Example 3.5: 100%

General Example 4: Grinding in a Stirred Ball Mill

A 3.0-liter beaker was tared, and 200 g of Aalborg White Cement CEM I 52.5 R were added. Optionally, in accordance with table 3, a polymer solution was added, to give a specific ratio of cement to polymer of 4. The polymer metering here is based on the solids content of polymer in the polymer solution. Subsequently, the balance to a mass of 2000 g was made with deionized water. This suspension was stirred until homogeneous, then placed into the reservoir vessel of the stirred ball mill, and immediately stirred therein with an IKA overhead stirrer so that no separation occurred. Grinding was carried out using a Netzsch LabStar 01 stirred ball mill. Grinding took place in a jacket-cooled grinding chamber (grinding compartment volume of 0.93 liter) with SiC lining, so that the temperature of the suspension is pumped in circulation was 30° C. In the interior of the grinding chamber there was a polyethylene disc stirring mechanism (PU-TriNex-993.06/A4). The grinding chamber was filled with $ZrO_2$ beads (diameter of 0.8-1.0 mm) to a grinding media fill level of 85 vol %. To obtain this bulk of beads, 586.5 ml of beads were measured out into a measuring cylinder and then introduced into the grinding chamber.

The suspension was pumped through the stirred ball mill in circulation by means of a peristaltic pump from Ismatec (Ismatec-MCP-Prozess-IP65) for a defined time (cf. table 2) with a pumping capacity (pumping rate) at 22 liters/hour. The speed of rotation of the stirrer of the ball mill was 3500 revolutions per minute.

When the stipulated grinding time had expired, the ground suspension was introduced into a PE container.

The specific grinding energy $E_m$ was determined via the following relationship:

$$E_m = P \cdot \frac{t}{m} [\text{kWh/tonne}]$$

Where P is the actual recorded shaft power in kilowatts and was read off on the stirred ball mill, t is the grinding time in hours, and m the mass of suspension used and pumped in the circuit.

TABLE 3 stirred ball mill grinding

| Example | Polymer | Grinding time [min] | A | B | C | D |
| --- | --- | --- | --- | --- | --- | --- |
| 4.1 | — | 120 | 0 | 51.2 | 0.54 | 1970 |
| 4.2 | 1 | 120 | 92 | 58.4 | 0.94 | 1870 |
| 4.3 | 1 | 240 | 92 | 76.9 | 1.24 | 3720 |

A: Suspended matter fraction M in [%]
B: Cumulative heat of hydration after 6 h in [joules/gram (cement)]
C: Acceleration factor according to L. Nicoleau (2012) [d(HF)/dt]
D: Specific energy $E_m$ in [kWh/ton (suspension)]

Determination of the Cumulative Heat of Hydration in Examples 3 and 4:
a) 1 gram, based on the cement content originally present in the suspension, of a suspension from example 3 or 4 was weighed out into a beaker. b) Taking account of the water added through the suspension, the total amount of water was made up with deionized water to 20 g. c) Subsequently, 50 g of Milke CEM I 52.5 R were added. d) The components were homogenized with an IKA paddle stirrer at 750 rpm. e) 3 g of this homogeneous cement paste were passed on for isothermal heat flow calorimetry.

What is claimed is:
1. A process for producing a composition suitable as an accelerator for curing cement, the process comprising
contacting
aa) at least one hydraulic binder, and
bb) at least one dispersant for dispersing inorganic particles in water, and
cc) water,
wherein a weight ratio of components aa) to cc) ranges from 1.5:1 to 1:70, and
a weight ratio of components aa) to bb) ranges from 20:1 to 1:2.

2. The process according to claim 1, wherein said at least one dispersant comprises a water-soluble polymer having polyether groups of structural unit (I)

$*-U-(C(O))_k-X-(AlkO)_n-W$      (I)

where
* represents a bonding site to the polymer,
U is a chemical bond or an alkylene group having 1 to 8 carbons,
X is oxygen, sulfur or a group $NR^1$, where $R^1$ is hydrogen, $C_1$-$C_4$ alkyl or benzyl,
k is 0 or 1,
n is an integer whose average value, based on the polymer, ranges from 3 to 300,
Alk is each independently a $C_2$-$C_4$ alkylene, and
W is a hydrogen, a $C_1$-$C_6$ alkyl, an aryl radical, or is a Y-F group, where
    Y is a linear or branched alkylene group having 2 to 8 carbons and optionally a phenyl ring,
    F is a 5- to 10-membered nitrogen heterocycle which is bonded via nitrogen and which as ring members, besides the nitrogen atom and carbon atoms, optionally has 1, 2 or 3 additional heteroatoms selected from the group consisting of oxygen, nitrogen, and sulfur; optionally the nitrogen ring members have a group $R^2$ which is hydrogen, a $C_1$-$C_4$ alkyl or benzyl; and 1 or 2 carbon ring members are present in the form of a carbonyl group.

3. The process according to claim 1, wherein said at least one dispersant comprises at least one group selected from the group consisting of a carboxyester group, a carboxyl group, a phosphono group, a sulfino group, a sulfo group, a sulfamido group, a sulfoxy group, a sulfoalkyloxy group, a sulfinoalkyloxy group, and a phosphonooxy group.

4. The process according to claim 1, wherein said at least one dispersant comprises a polycondensation product comprising
    (II) a structural unit containing an aromatic or heteroaromatic group and a polyether group, and
    (III) a phosphated structural unit containing an aromatic or heteroaromatic group.

5. The process according to claim 4, wherein
the structural unit (II) is represented by formula $A-U-(C(O))_k-X-(AlkO)_n-W$ where
each A is independently a substituted or unsubstituted, aromatic or heteroaromatic compound having 5 to 10 carbons in the aromatic system, U is a chemical bond or an alkylene group having 1 to 8 carbons,
X is oxygen, sulfur or a group $NR^1$, where $R^1$ is hydrogen, $C_1$-$C_4$ alkyl or benzyl,
k is 0 or 1,
each Alk is independently a $C_2$-$C_4$ alkylene,
n is an integer whose average value, based on the polymer, ranges from 3 to 300,
W is a hydrogen, a $C_1$-$C_6$ alkyl, an aryl radical, or is a Y-F group, where
    Y is a linear or branched alkylene group having 2 to 8 carbons and optionally a phenyl ring,
    F is a 5- to 10-membered nitrogen heterocycle which is bonded via nitrogen and which as ring members, besides the nitrogen atom and carbon atoms, optionally has 1, 2 or 3 additional heteroatoms selected from the group consisting of oxygen, nitrogen, and sulfur; optionally the nitrogen ring members have a group $R^2$ which is hydrogen, a $C_1$-$C_4$ alkyl or benzyl;

and 1 or 2 carbon ring members are present in the form of a carbonyl group; and
the structural unit (III) is represented by formula

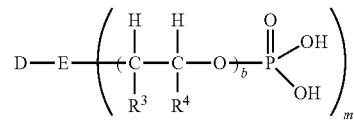

where
each D is independently a substituted or unsubstituted, aromatic or heteroaromatic compound having 5 to 10 carbons in the aromatic system,
E is independently N, NH or O,
m=2 if E=N and m=1 if E=NH or O,
each $R^3$ and each $R^4$ are independently a branched or unbranched $C_1$ to $C_{10}$ alkyl radical, $C_5$ to $C_8$ cycloalkyl radical, aryl radical, heteroaryl radical or H,
and each b is independently an integer from 0 to 300.

6. The process according to claim 4, wherein the polycondensation product comprises a further structural unit (IV) represented by formula

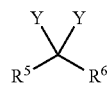

wherein
$R^5$ and $R^6$ are each independently H, $CH_3$, COOH or a substituted or unsubstituted, aromatic or heteroaromatic compound having 5 to 10 carbons,
each Y is independently the structural unit (II), the structural unit (III), or a further constituent of the polycondensation product.

7. The process according to claim 1, wherein said at least one dispersant comprises at least one copolymer which is obtained by polymerization of a mixture of monomers comprising
    (V) at least one ethylenically unsaturated monomer which comprises at least one radical selected from the group consisting of a carboxylic acid, a carboxylic salt, a carboxylic ester, a carboxylic amide, a carboxylic anhydride, and a carboxylic imide; and
    (VI) at least one ethylenically unsaturated monomer comprising a polyether group.

8. The process according to claim 7, wherein the ethylenically unsaturated monomer (V) is at least one selected from the group consisting of (Va), (Vb), and (Vc)

(Va)

(Vb)

where
R⁷ and R⁸ independently of one another are hydrogen or an aliphatic hydrocarbon radical having 1 to 20 carbons;

B is H, —COOM$_a$, —CO-O(C$_q$H$_{2q}$O)$_r$—R⁹, —CO—NH—(C$_q$H$_{2q}$O)$_r$—R⁹, where M is hydrogen, a mono-, di- or trivalent metal cation, ammonium ion or an organic amine radical, a is ⅓, ½ or 1, R⁹ is hydrogen, an aliphatic hydrocarbon radical having 1 to 20 carbons, a cycloaliphatic hydrocarbon radical having 5 to 8 carbons, an optionally substituted aryl radical having 6 to 14 carbons, q independently for each (C$_q$H$_{2q}$O) unit is 2, 3 or 4, and r is 0 to 200;

Z is O, NR¹⁶, where R¹⁶ independently at each occurrence is represented by a branched or unbranched C₁ to C₁₀ alkyl radical, C₅ to C₈ cycloalkyl radical, aryl radical, heteroaryl radical or H,

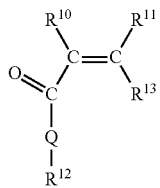

(Vc)

where
R¹⁰ and R¹¹ independently of one another are hydrogen, an aliphatic hydrocarbon radical having 1 to 20 carbons, a cycloaliphatic hydrocarbon radical having 5 to 8 carbons, or an optionally substituted aryl radical having 6 to 14 carbons;

R¹² is independently (C$_n$H$_{2n}$)—SO₃H with n=0, 1, 2, 3 or 4 (C$_n$H$_{2n}$)—OH with n=0, 1, 2, 3 or 4; (C$_n$H$_{2n}$)—PO₃H₂ with n=0, 1, 2, 3 or 4, (C$_n$H$_{2n}$)—OPO₃H₂ with n=0, 1, 2, 3 or 4, (C₆H₄)—SO₃H, (C₆H₄)—PO₃H₂, (C₆H₄)—OPO₃H, or (C$_n$H$_{2n}$)—NR¹⁴$_b$ with n=0, 1.2, 3 or 4 and b=2 or 3;

R¹³ is H, —COOM$_a$, —CO—O(C$_q$H$_{2q}$O)$_r$—R⁹, —CO—NH—(C$_q$H$_{2q}$O)$_r$—R⁹, where M, a, R⁹, q and r possess definitions stated above;

R¹⁴ is hydrogen, an aliphatic hydrocarbon radical having 1 to 10 carbons, a cycloaliphatic hydrocarbon radical having 5 to 8 carbons, an optionally substituted aryl radical having 6 to 14 carbons; and Q is independently NH, NR¹⁵ or O, where R¹⁵ is an aliphatic hydrocarbon radical having 1 to 10 carbons, a cycloaliphatic hydrocarbon radical having 5 to 8 carbons or an optionally substituted aryl radical having 6 to 14 carbons.

9. The process according to claim 1, wherein said at least one dispersant comprises at least one water-soluble polymer which has an average molar weight (Mw) of between 5000 and 150 000 g/mol as determined by gel permeation chromatography.

10. The process according to claim 1, where the components aa), bb), and cc) are contacted with one another until suspended matter fraction M is greater than 25 wt %,
wherein M is determined by a method comprising:
a) preparing a suspension by making up 2 grams of the composition, based on solids fraction, to a volume of 100 ml with distilled water,
b) transferring the suspension to a measuring cylinder to reach a height of 20 cm in the cylinder,
c) leaving the cylinder to stand at 20° C. for 24 hours,
d) fully decanting supernatant into a beaker,
e) carrying out quantitative determination of mass m and solids content SC for sediment and the supernatant in the cylinder represented by m$_{sediment}$, SC$_{sediment}$ m$_{supernatant}$, and SC$_{supernatant}$, respectively and calculating the suspended matter fraction M as follows:

$M = SC_{supernatant} \cdot m_{supernatant} / (SC_{sediment} \cdot m_{sediment} + SC_{supernatant} \cdot m_{supernatant}) \cdot 100\%.$ 11. The process according to claim 1, wherein said contacting takes place with introduction of shearing energy of more than 100 kWh per metric ton of the composition.

12. The process according to claim 1, wherein the weight ratio of components aa) to bb) ranges from 10:1 to 1:2.

13. A method for accelerating hardening of a chemical mixture in construction, the method comprising:
adding a composition into the chemical mixture,
wherein
the composition comprises aa) at least one hydraulic binder, bb) at least one dispersant for dispersing inorganic particles in water, and cc) water,
a weight ratio of components aa) to cc) ranges from 1.5:1 to 1:70, and
a weight ratio of components aa) to bb) ranges from 20:1 to 1:2.

* * * * *

UNITED STATES PATENT AND TRADEMARK OFFICE
CERTIFICATE OF CORRECTION

PATENT NO. : 10,618,842 B2
APPLICATION NO. : 15/753603
DATED : April 14, 2020
INVENTOR(S) : Torben Gaedt et al.

It is certified that error appears in the above-identified patent and that said Letters Patent is hereby corrected as shown below:

In the Specification

In Column 2, Line 25 (approx.), delete "benzyl" and insert -- benzyl. --, therefor.

In Column 3, Line 8, delete "$R^4\text{=\!=}H$" and insert -- $R^4\text{=}H$ --, therefor.

In Column 4, Line 50, delete "$Z\text{=\!=}O$" and insert -- $Z\text{=}O$ --, therefor.

In Column 4, Lines 61-62, delete "cycloalkylamines," and insert -- $C_{5-8}$ cycloalkylamines, --, therefor.

In Column 5, Line 34 (approx.), delete "$(C_n\text{-}H_{2n})$" and insert -- $(C_nH_{2n})$ --, therefor.

In Column 5, Line 37 (approx.), delete "$(C_5H_4)$" and insert -- $(C_6H_4)$ --, therefor.

In Column 6, Line 67, delete "$m_{sediment} \cdot SC_{supernatant}$" and insert -- $m_{sediment} + SC_{supernatant}$ --, therefor.

In Column 6, Line 67, delete "$m_{sediment} \cdot SC_{supernatant}$" and insert -- $m_{sediment} + SC_{supernatant}$ --, therefor.

In Column 8, Line 32, delete "flyash" and insert -- fly ash --, therefor.

In Column 8, Line 49, delete "flyash" and insert -- fly ash --, therefor.

In Column 9, Line 6, delete "flyash" and insert -- fly ash --, therefor.

In Column 9, Lines 15-16, delete "flyash" and insert -- fly ash --, therefor.

In Column 9, Line 38, delete "cylinder" and insert -- cylinder. --, therefor.

In Column 10, Line 1, delete "again" and insert -- again. --, therefor.

Signed and Sealed this
Eighth Day of September, 2020

Andrei Iancu
*Director of the United States Patent and Trademark Office*

CERTIFICATE OF CORRECTION (continued)
U.S. Pat. No. 10,618,842 B2

In Column 10, Line 17 (approx.), delete "$m_{sediment} \cdot SC_{supernatant}$" and insert -- $m_{sediment} + SC_{supernatant}$ --, therefor.

In Column 11, Line 30 (approx.), delete "Bozetto" and insert -- Bozzetto --, therefor.

In Column 11, Line 32 (approx.), delete "Blank" and insert -- Blank: --, therefor.

In Column 14, Line 13, delete "Prozess" and insert -- Process --, therefor.

In the Claims

In Column 15, Line 25, Claim 2, delete "$R^2$" and insert -- $R^2$, --, therefor.

In Column 15, Line 57, Claim 5, delete "aY-F" and insert -- a Y-F --, therefor.

In Column 17, Line 38 (approx.), Claim 8, delete "4" and insert -- 4, --, therefor.

In Column 17, Line 41 (approx.), Claim 8, delete "$OPO_3H$" and insert -- $OPO_3H_2$ --, therefor.

In Column 17, Line 41 (approx.), Claim 8, delete "n=0, 1.2, 3" and insert -- n=0, 1, 2, 3 --, therefor.